(12) United States Patent
Chen et al.

(10) Patent No.: US 9,237,092 B2
(45) Date of Patent: Jan. 12, 2016

(54) METHOD, APPARATUS, AND SYSTEM FOR UPDATING RING NETWORK TOPOLOGY INFORMATION

(75) Inventors: Jianqun Chen, Shenzhen (CN); Jia He, Shenzhen (CN)

(73) Assignee: Huawei Technologies Co., Ltd., Shenzhen (CH)

( * ) Notice: Subject to any disclaimer, the term of this patent is extended or adjusted under 35 U.S.C. 154(b) by 385 days.

(21) Appl. No.: 13/437,295

(22) Filed: Apr. 2, 2012

(65) Prior Publication Data

US 2012/0188912 A1 Jul. 26, 2012

Related U.S. Application Data

(63) Continuation of application No. PCT/CN2010/078392, filed on Nov. 4, 2010.

(30) Foreign Application Priority Data

Nov. 11, 2009 (CN) .......................... 2009 1 0224731

(51) Int. Cl.
*H04L 12/751* (2013.01)
*H04L 12/703* (2013.01)
*H04L 12/40* (2006.01)
*H04L 12/437* (2006.01)
*H04L 12/723* (2013.01)

(52) U.S. Cl.
CPC .......... *H04L 45/28* (2013.01); *H04L 12/40032* (2013.01); *H04L 12/437* (2013.01); *H04L 45/02* (2013.01); *H04L 45/50* (2013.01)

(58) Field of Classification Search
CPC .......... H04L 45/02; H04L 45/26; H04L 45/28
See application file for complete search history.

(56) References Cited

U.S. PATENT DOCUMENTS

| | | | | |
|---|---|---|---|---|
| 6,549,513 | B1 * | 4/2003 | Chao et al. ..................... | 370/227 |
| 6,639,897 | B1 * | 10/2003 | Shiomoto et al. ............. | 370/238 |
| 7,058,024 | B1 | 6/2006 | Koay | |
| 7,126,921 | B2 * | 10/2006 | Mark et al. ..................... | 370/242 |
| 7,142,504 | B1 * | 11/2006 | Uzun ............................ | 370/224 |
| 7,221,870 | B2 * | 5/2007 | Lu ................................... | 398/59 |

(Continued)

FOREIGN PATENT DOCUMENTS

| | | |
|---|---|---|
| CN | 1290089 A | 4/2001 |
| CN | 1645834 A | 7/2005 |

(Continued)

OTHER PUBLICATIONS

Office Action dated Jun. 27, 2013 in connection with Korean Patent Application No. 10-2012-7005589.

(Continued)

*Primary Examiner* — Gregory Sefcheck

(57) ABSTRACT

A method for updating ring network topology information includes: receiving a topology discovery packet from an originating node, where the topology discovery packet at least carries identifiers of nodes traversed by the topology discovery packet when the packet is transferred from the originating node to a current node; and updating ring network topology information of the current node according to the identifiers of the nodes carried in the topology discovery packet. The apparatus includes a receiving module and an updating module. The system includes an originating node and a receiving node.

18 Claims, 14 Drawing Sheets

(56) References Cited

U.S. PATENT DOCUMENTS

| | | | |
|---|---|---|---|
| 7,343,409 B1 * | 3/2008 | Kremer et al. | 709/224 |
| 7,599,283 B1 * | 10/2009 | Varier et al. | 370/216 |
| 7,697,461 B2 * | 4/2010 | Shi et al. | 370/258 |
| 7,752,338 B2 * | 7/2010 | Lu et al. | 709/251 |
| 7,958,271 B2 * | 6/2011 | Zou et al. | 709/249 |
| 8,374,122 B2 * | 2/2013 | Meier et al. | 370/328 |
| 8,423,639 B2 * | 4/2013 | Pope et al. | 709/224 |
| 8,464,054 B2 * | 6/2013 | Prestidge et al. | 713/168 |
| 8,520,508 B2 * | 8/2013 | Zinjuvadia et al. | 370/222 |
| 2002/0109879 A1 * | 8/2002 | Wing So | 359/118 |
| 2002/0186667 A1 | 12/2002 | Mor et al. | |
| 2006/0212551 A1 | 9/2006 | Kao et al. | |
| 2007/0071442 A1 * | 3/2007 | Lu | 398/59 |
| 2007/0230368 A1 | 10/2007 | Shi et al. | |
| 2008/0316951 A1 * | 12/2008 | Zeng et al. | 370/312 |
| 2010/0061231 A1 * | 3/2010 | Harmatos et al. | 370/228 |

FOREIGN PATENT DOCUMENTS

| | | | |
|---|---|---|---|
| CN | 1761219 A | | 4/2006 |
| CN | 101141404 A | | 3/2008 |
| CN | 101409666 A | | 4/2009 |
| CN | 101702663 A | | 5/2010 |
| EP | 1 434 393 A2 | | 6/2004 |
| EP | 1 802 048 A1 | | 6/2007 |
| EP | 2 458 797 A1 | | 5/2012 |
| JP | 2007243288 A | | 9/2007 |
| WO | WO 2008/004066 A2 | | 1/2008 |

OTHER PUBLICATIONS

"Resilient Packet Ring Technology and Standardization trend based on IEEE 802.17", Apr. 2005, p. 411-425.

Partial Translation of CN101409666A.

Written Opinion of the International Searching Authority (Translation), dated (mailed) Feb. 10, 2011; issued in related Application No. PCT/CN2010/078392; Huawei Tech Co., Ltd. (6 pgs).

International Search Report (Translation), dated (mailed) Feb. 10, 2011; issued in related Application No. PCT/CN2010/078392; Huawei Tech Co., Ltd. (4 pgs.).

European Patent Office Communication, dated (mailed) May 23, 2012, related to extended European search report, pursuant to Rule 62 EPC, the supplementary European search report (Art. 153(7) EPC) and the European search opinion, issued in related Application No. 10829504.9-1249, Huawei Tech Co., Ltd. (9 pgs.).

Zhou, Yuli et al.; "A New Topology Discovery Protocol for Multi-ring Interconnected Resilient Packet Rings"; Network Architectures, Management, and Applications; Proceedings of SPIE vol. 5282 (2 pgs.).

First Chinese Office Action (Partial Translation) issued in related Application No. 200910224731.3; dated (mailed) Mar. 24, 2011 (17 pgs.).

Second Chinese Office Action (Partial Translation) issued in related Application No. 200910224731.3; dated (mailed) Nov. 22, 2011 (11 pgs.).

* cited by examiner

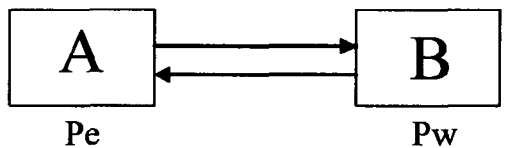

FIG. 4

| When node A finds that there is no valid topology information (or that the Pe interface changes from the disconnected state to the connected state), node A sends a topology discovery packet P (A) to the Pe interface | 501 |

↓

| Node B receives the P (A) from the Pw interface | 502 |

↓

| Node B determines that the originating node of the P (A) is not node B itself, and adds the node ID information of Node B to the packet to change the topology discovery packet to P (A, B) | 503 |

↓

| Node B judges whether the Pe interface of node B can send packets | 504 |

↓ No

| Node A receives the P (A, B) from the Pe interface | 505 |

↓

| Node A determines that the originating node of the P (A, B) is node A, and changes the stored ringmap to (A, B) | 506 |

FIG. 5

METHOD, APPARATUS, AND SYSTEM FOR UPDATING RING NETWORK TOPOLOGY INFORMATION

CROSS-REFERENCE TO RELATED APPLICATIONS

This application is a continuation of International Application No. PCT/CN2010/078392, filed on Nov. 4, 2010, which claims priority to Chinese Patent Application No. 200910224731.3, filed on Nov. 11, 2009, both of which are hereby incorporated by reference in their entireties.

FIELD OF THE DISCLOSURE

The present disclosure relates to the field of communication technologies, and in particular, to a method, an apparatus, and a system for updating ring network topology information.

BACKGROUND OF THE DISCLOSURE

A ring network is a network protection solution widely applied by operators for networking. The ring network has such advantages as simple configuration, good maintainability, and high reliability. Conventional ring networks include SDH (Synchronous Digital Hierarchy) ring networks and WDM (Wavelength Division Multiplexing) ring networks. With the emergence of packet transport networks, packet ring networks are developed gradually, for example, an MPLS (Multi Protocol Label Switching) ring network protection solution is developed.

The MPLS ring network protection technology is a mature packet ring protection technology in this field. In the MPLS ring network protection technology, the MPLS protection ring is a two-fiber bi-directional ring, on which the working channel and the protection channel are in opposite directions. Under normal circumstances, services are transmitted on the working channel. When a link on the MPLS protection ring fails, the MPLS ring network protection technology provides two switching modes, one is a wrapping switching mode, and the other is a steering switching mode. Either of the two modes may be used to change the service transmission path to guarantee the normal transmission of services when the link fails. When the failed link is restored, the MPLS protection ring transits from the switching state to a wait to restore (WTR) timing state. When the wait to restore timing ends, each node on the protection ring directly enters the Idle (idle) state, the switching state is cancelled, and the service path is restored to the original normal path.

In the prior art, each node on the protection ring is required to have the topology information of the entire ring in the protection switching process; however, if the topology of the protection ring is changed when link failures occur, ring protection abnormality may be resulted.

SUMMARY

To improve reliability and manageability of a ring network system, in one aspect, an embodiment of the present disclosure provides a method for updating ring network topology information, where the method includes:

receiving a topology discovery packet sent from an originating node, where the topology discovery packet at least carries identifiers of nodes traversed by the topology discovery packet when the packet is transferred from the originating node to a current node; and updating ring network topology information of the current node according to the identifiers of the nodes carried in the topology discovery packet.

In another aspect, an embodiment of the present disclosure also provides an apparatus for updating ring network topology information, where the apparatus includes:

a receiving module, configured to receive a topology discovery packet sent from an originating node, where the topology discovery packet at least carries identifiers of nodes traversed by the topology discovery packet when the packet is transferred from the originating node to a current node; and an updating module, configured to update ring network topology information of the current node according to the identifiers of the nodes carried in the topology discovery packet.

In still another aspect, an embodiment of the present disclosure further provides a system for updating ring network topology information, where the system includes:

an originating node, configured to send a topology discovery packet; and a receiving node, including the preceding apparatus for updating ring network topology information.

A ring instance node sends a topology discovery packet to other nodes in the ring instance, and carries the identifier of the ring instance node in the topology discovery packet; the topology discovery packet may record the identifier of each ring instance node when traversing each ring instance node; when the originating node of the topology discovery packet receives the topology discovery packet, the topology information of the ring instance is obtained. In this way, when the ring instance is created initially, each node may automatically obtain the topology of the entire ring, so that the ring network topology information of each node does not need to be configured manually. In addition, problems such as ring network protection abnormity due to the change of the ring network topology structure when link failures occur is avoided. Therefore, the configuration of the protection ring network is simplified, and nodes can be added or deleted dynamically without human intervention, thereby improving the reliability and manageability of the system.

BRIEF DESCRIPTION OF THE DRAWINGS

To describe the technical solution in embodiments of the present disclosure or in the prior art more clearly, the following outlines the accompanying drawings required in the description of the embodiments or the prior art. Apparently, the accompanying drawings illustrate only some exemplary embodiments of the present disclosure, and persons of ordinary skill in the art can derive other drawings from the accompanying drawings without creative efforts.

FIG. 4 is a schematic structure diagram of a ring network according to Embodiment 2 of the present disclosure;

FIG. 5 is a flowchart of a method for updating topology information of node A on the ring network shown in FIG. 4 according to Embodiment 2 of the present disclosure;

DETAILED DESCRIPTION OF THE EMBODIMENTS

For better understanding of the above objective, features, and merits of the present disclosure, the present disclosure is hereinafter described in detail with the accompanying drawings and exemplary embodiments.

Embodiment 1

Figure 1:
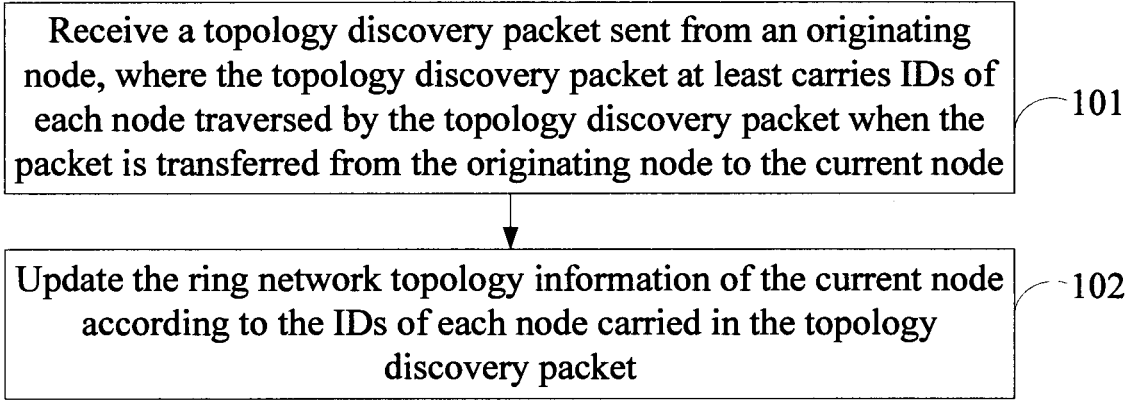
FIG. 1 is a flowchart of a method for updating ring network topology information according to Embodiment 1 of the present disclosure.

Embodiment 1 provides a method for updating ring network topology information. As shown in FIG. 1, the method includes the following steps:

Step 101: Receive a topology discovery packet sent from an originating node, where the topology discovery packet at least carries identifiers (IDs) of nodes traversed by the topology discovery packet when the packet is transferred from the originating node to the current node.

Figure 2:
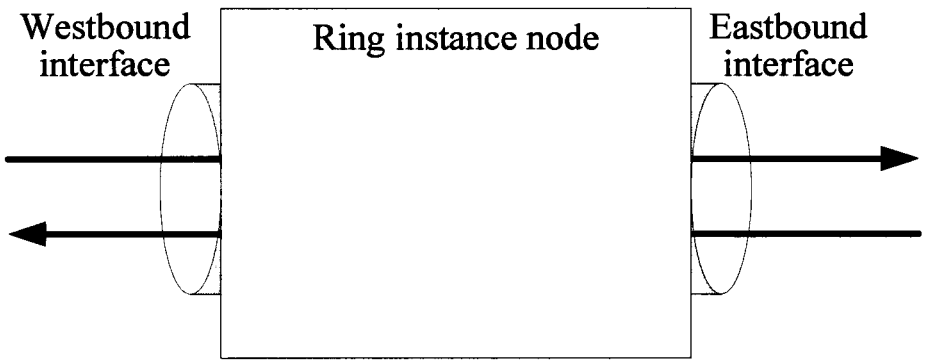
FIG. 2 is a schematic structure diagram of a ring instance according to Embodiment 1 of the present disclosure.

The ring instance node (referred to as the node) is shown in FIG. 2. Each ring instance node has two interfaces (a westbound interface and an eastbound interface). One ring instance may be composed of one or multiple ring instance nodes. Each ring instance has an identifier, and the identifiers of intersecting and tangent ring instances cannot be the same. The identifier of a ring instance is used to identify the ring instance uniquely. The identifier of the ring instance may be represented by a Virtual Local Area Network (VLAN) tag, an MPLS label, or other private information or equivalent information that identifies the ring instance to which the topology discovery packet belongs, carried in the topology discovery packet. Each ring instance node has an identifier, and the identifier is unique among all the nodes of the ring instance to which the ring instance node belongs. In this way, a ring instance node may be determined according to the ring instance identifier and the ring instance node identifier.

State of the topology information may at least include the following: initial state, updating state, available state, and unavailable state. The initial state of the topology information refers to a state when a ring instance is set up initially. The updating state of the topology information refers to a state when the ring instance is updating the topology information. The available state of the topology information refers to a state after the topology information update is completed normally. The unavailable state of the topology information refers to a state after an abnormity occurs in the topology information update. The topology information may transit from one state to another state. For example, when the ring instance is set up and begins to update the topology information, the topology information transits from the initial state to the updating state; after the topology information update is completed normally, the topology information transits from the updating state to the available state; when an abnormity occurs in the topology information update, the topology information transits from the updating state to the unavailable state; when the topology information is in the available state, if a failed ring interface is restored, the activation of the topology information update may be triggered, and the topology information transits from the available state to the updating state; when the topology information is in the unavailable state, the activation of the topology information update may be re-triggered in manual mode or timing mode, and the topology information transits from the unavailable state to the updating state.

According to the transit between different states, the update trigger signal of the ring instance may at least include three types: type 1: signal for triggering the topology information update when the topology information is in the initial state in a scenario where the ring network is set up and the ring instance is activated; type 2: signal for triggering the topology information update when the topology information is in the available state in a scenario where a failed ring network link or node is restored; type 3: signal for triggering the topology information update when the topology information is in the unavailable state in a scenario where the topology information update is triggered in manual mode or timing mode.

For the first type of update trigger signal, each node in the ring instance may receive the update trigger signal, and act as the originating node to initiate the process of updating the topology information. For the second type of update trigger signal, the ring instance nodes at both ends of the failed link may receive the update trigger signal, and act as the originating node to initiate the process of updating the topology information; for the third type of update trigger signal, ring instance nodes in the unavailable state may receive the update trigger signal, and act as the originating node to initiate the process of updating the topology information.

In an embodiment of the present disclosure, the update trigger signal may be ring instance activation information. After the update trigger signal is obtained, the topology information transits from the initial state to the updating state.

In another embodiment of the present disclosure, the update trigger signal may be a restore signal. After the update trigger signal is obtained, the topology information transits from the available state to the updating state.

The third type of update trigger signal is similar to the first type and the second type of update trigger signal in the topology update process except for only the difference in the trigger mechanism, and is not described.

Step 102: Update the ring network topology information of the current node according to the identifiers of the nodes carried in the topology discovery packet.

Figure 15:
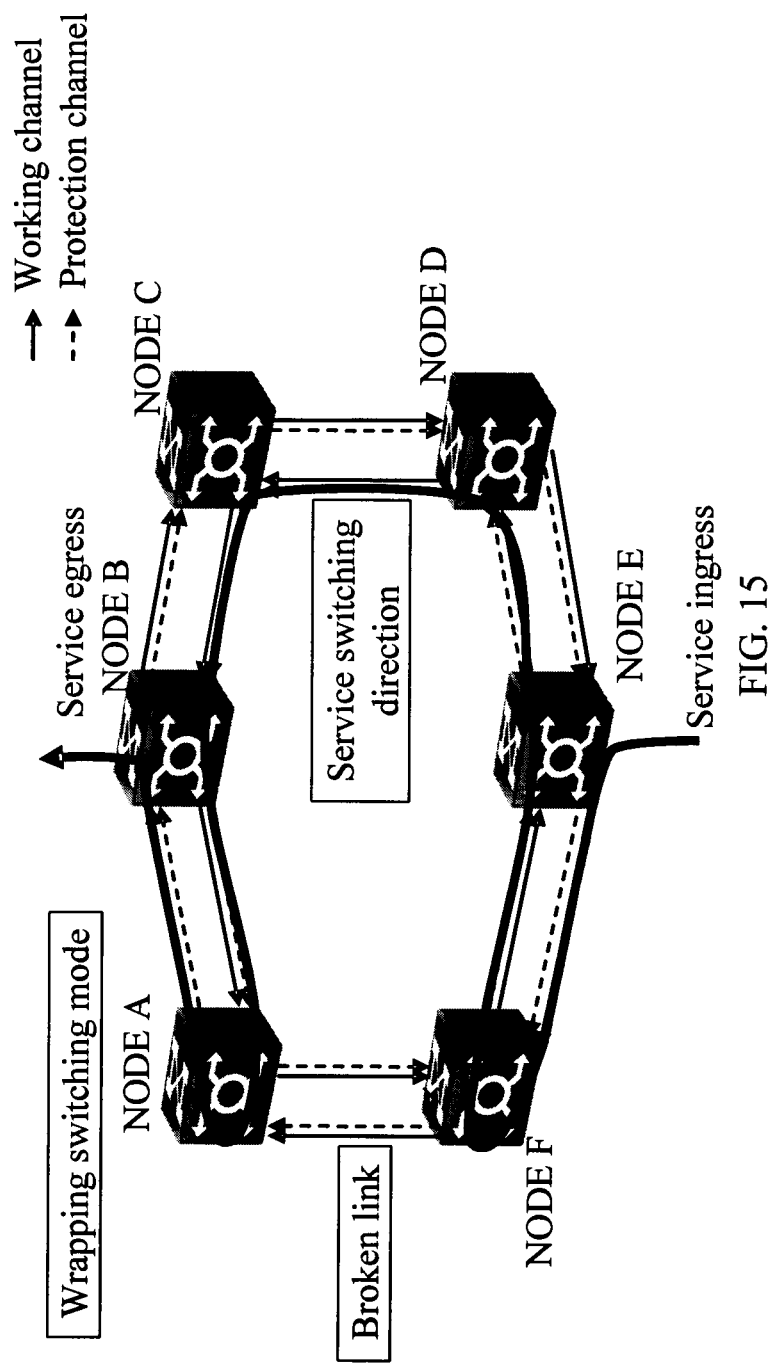
FIG. 15 shows a flow chart of a wrapping switching method.
Figure 16:
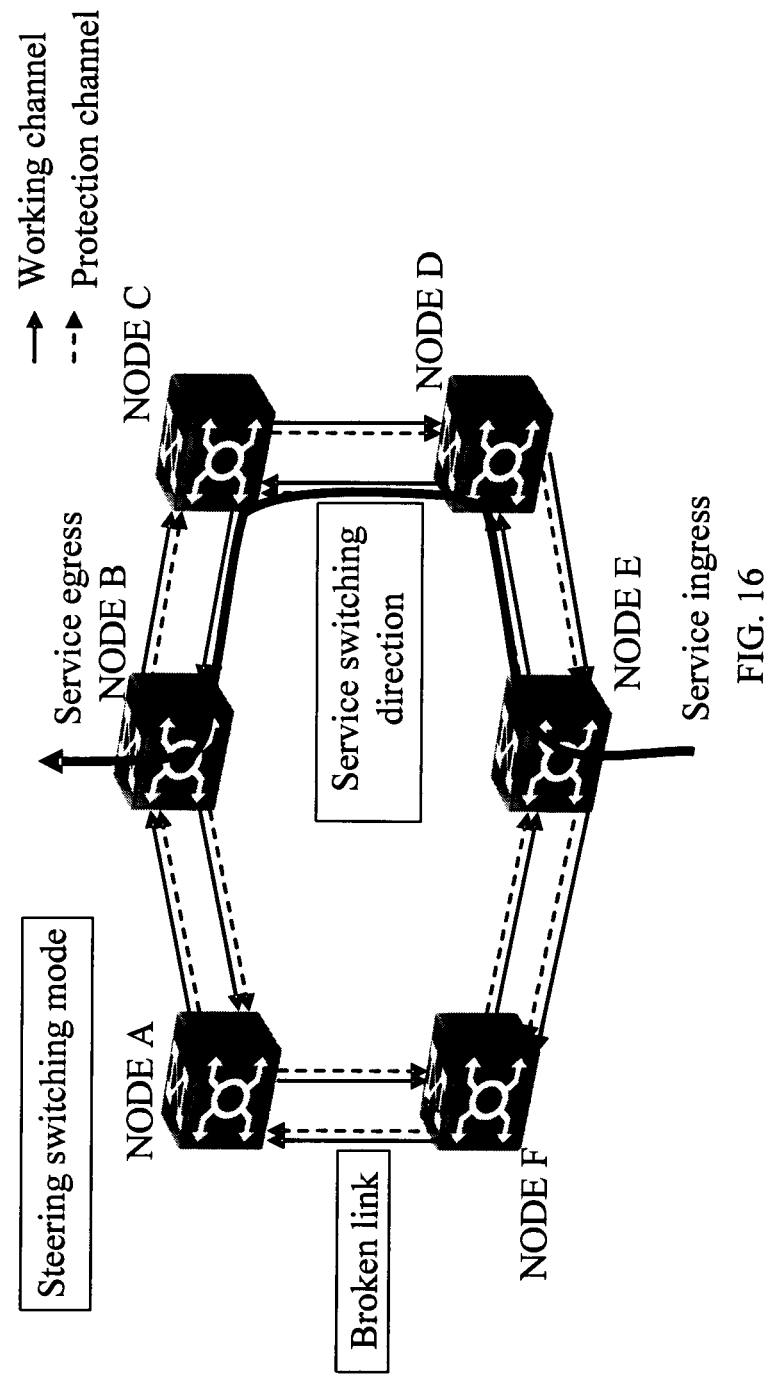
FIG. 16 shows a flow chart of a steering switching method.

Before describing Embodiment 2 of the present disclosure, the following deals with two switching modes in the MPLS ring network protection technology. In wrapping switching mode, when a link on the MPLS protection ring is broken, a node detecting the link failure sends an APS (automatic protection switching) protocol packet to a peer node of the failed point, notifying the peer node of performing protection switching. For example, as shown in FIG. 15, a service is originally transmitted on the Node E-F-A-B path; when the link between node F and node A fails, node F and node A detect the failure respectively, and notify each other of performing switching. In this case, the service path is changed to Node E-F-E-D-C-B-A-B. In steering switching mode, when a link on the MPLS protection ring is disconnected, two neighboring nodes on the failed link may send an APS protocol packet respectively to all the nodes on the MPLS protection ring to notify the failed state; each node on the MPLS protection ring controls the service flow on the current node according to the entire ring network topology and failure notification to bypass the failed link. For example, as shown in FIG. 16, when a link between node A and node F fails, node A and node F may send an APS notification packet to notify the failed state on the entire network; after receiving the APS notification packet, node E and node B update the ring network topology stored on node E and node B respectively, analyze the ring network topology, and then switch the service path to Node E-D-C-B.

Embodiment 2

Figure 3A:
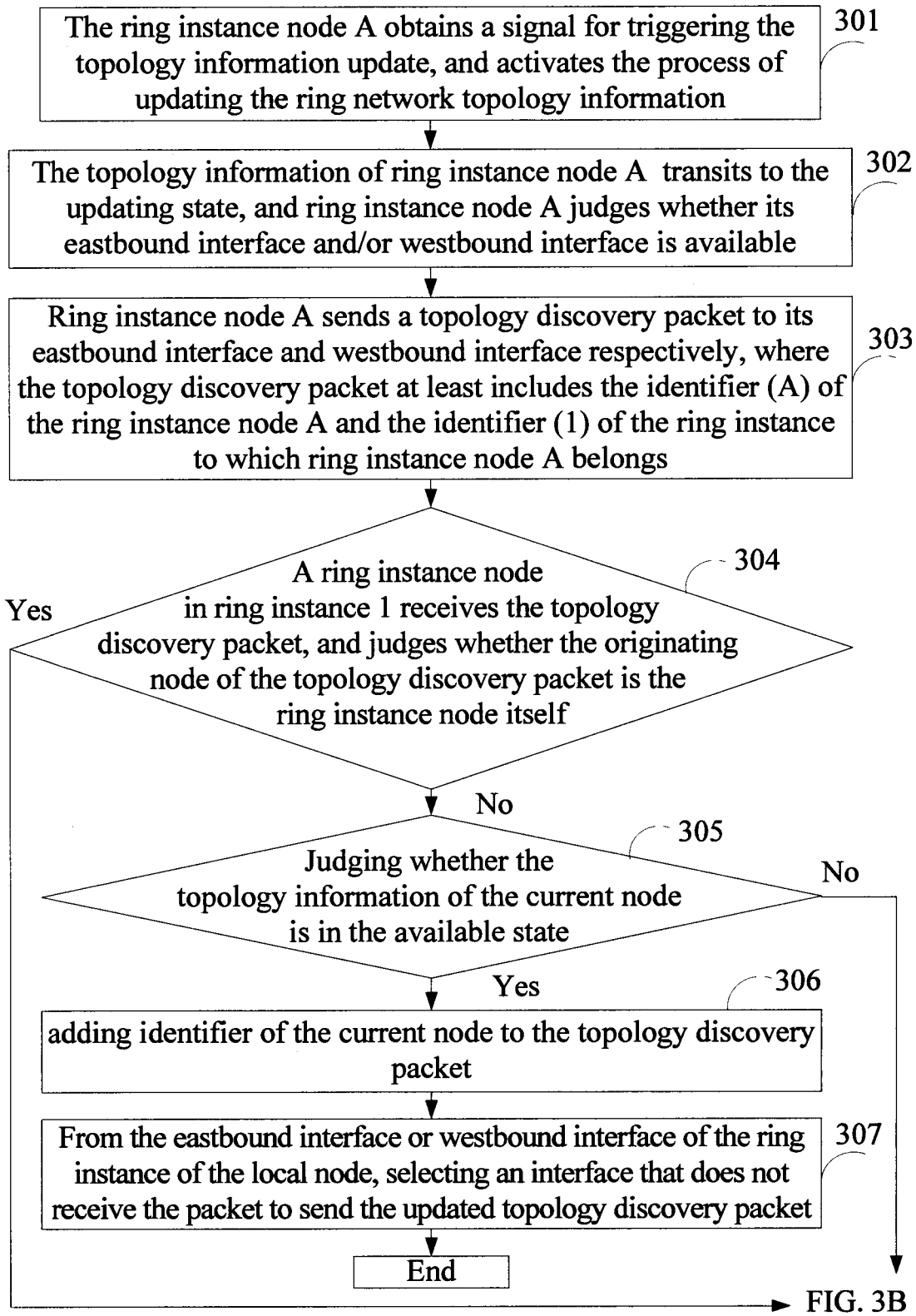
FIGS. 3A and 3B are a flowchart of a method for updating ring network topology information according to Embodiment 2 of the present disclosure.
Figure 3B:
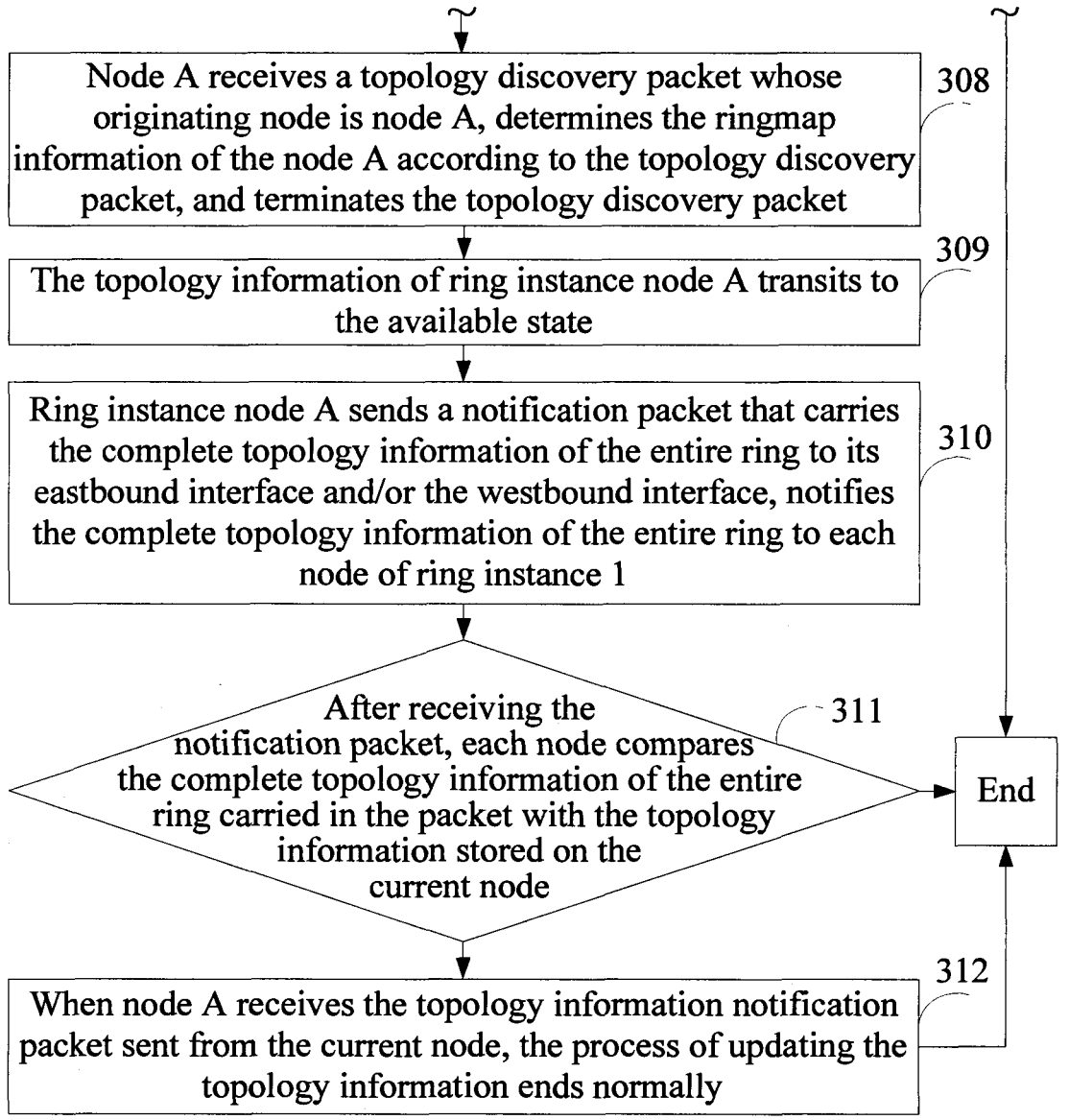

Embodiment 2 of the present disclosure provides a method for updating ring network topology information. The embodiment of the present disclosure takes the first type of update trigger signal as an example, and uses a ring instance node (A) in any ring instance (ring instance 1) on the network as an object for description. The update processes of other ring instance nodes in ring instance 1 are the same as the update process of the ring instance node A, and are not described. As shown in FIG. 3, the method includes the following steps:

Step 301: Ring instance node A obtains a signal for triggering the topology information update, and activates the process of updating the ring network topology information.

Step 302: The topology information of ring instance node A transits from the initial state to the updating state, and ring instance node A judges whether its eastbound interface and/or westbound interface is available.

When at least one interface of the bi-directional interfaces is available, ring instance node A executes step 303.

Otherwise, the process of updating the topology information of ring instance node A ends. The topology information of ring instance node A transits to the available state. The current node is recorded as an isolated node in the topology information.

Step 303: Ring instance node A sends a topology discovery packet to its available eastbound interface and westbound interface respectively, where the topology discovery packet at least includes the identifier (A) of ring instance node A and the identifier (1) of the ring instance to which ring instance node A belongs.

In the embodiment of the present disclosure, ring instance node A that initiates the topology discovery packet is called the originating node.

Step 304: The topology discovery packet is sent according to the ring instance identifier; a ring instance node in ring instance 1 receives the topology discovery packet, and judges whether the originating node of the topology discovery packet is the ring instance node itself.

If the originating node of the topology discovery packet is not the ring instance node itself, the process goes to step 305.

If the originating node of the topology discovery packet is the ring instance node itself, the process goes to step 308.

The method for judging whether the originating node of the topology discovery packet is the ring instance node itself includes: querying whether the identifier of the first ring instance node in the topology discovery packet is the same as the identifier of the ring instance node; if the identifier of the first ring instance node in the topology discovery packet is the same as the identifier of the ring instance node, determining that the ring instance node is the originating node of the topology discovery packet; if the identifier of the first ring instance node in the topology discovery packet is different from the identifier of the ring instance node, determining that the ring instance node is not the originating node of the topology discovery packet.

Step 305: Judging whether the topology information of the current node is in the available state.

If the topology information of the current node is not in the available state, do not update the topology information of the current node.

If the topology information of the current node is in the available state, update the topology information of the current node according to the information carried in the topology discovery packet.

Step 306: Adding the identifier of the current node to the topology discovery packet.

The topology discovery packet carries the identifier information of ring instance nodes traversed by the packet when the packet is transferred in the ring instance according to the identifier of the ring instance to which the originating node belongs, and implicitly carries the connection information between each ring instance nodes in the ring instance (the sequence of the identifier information of each ring instance node is the connection information between nodes traversed by the packet).

Step 307: From the eastbound interface or westbound interface of the ring instance node, selecting an interface that does not receive the packet to send the updated topology discovery packet.

When the eastbound interface receives the packet, the topology discovery packet with the added identifier information of the current node is sent via the westbound interface of the current node.

When the westbound interface receives the packet, the topology discovery packet with the added identifier information of the current node is sent via the eastbound interface of the current node.

When it is earlier detected that the interface not receiving the packet of the current node fails, the packet is sent via the interface that receives the packet.

Therefore, if ring instance node A sends a topology discovery packet via one (for example, the eastbound interface) of the two interfaces and still receives a returned topology discovery packet via the same interface (for example, the eastbound interface), ring instance node A may determine that a failure occurs on the ring network.

Step 308: Ring instance node A receives a topology discovery packet whose originating node is ring instance node A, determines ringmap information of ring instance node A according to the topology discovery packet received by the eastbound interface or westbound interface, and terminates the topology discovery packet of the eastbound interface or westbound interface.

Due to the features of the ring network, when each node in ring instance 1 works normally, the node identifier information carried in the topology discovery packet received by the eastbound interface and westbound interface of ring instance node A is in reverse sequence. Therefore, ring instance node A may determine the ringmap information of ring instance node A according to the information carried in the topology discovery packet received by the eastbound interface or according to the information carried in the topology discovery packet received by the westbound interface. In addition, the topology discovery packet received by the eastbound interface may be verified by the topology discovery packet received by the westbound interface, or vice versa. If the link or device between two nodes on the ring network fails, the node identifier information carried in the topology discovery packet received by the eastbound interface or westbound interface of node A indicates a link.

The preceding two types of topology discovery packets are valid packets compliant with certain rules, for example, ABCDA received by the westbound interface and ADCBA received by the eastbound interface, or ABCBA received by the westbound interface and ADCDA received by the eastbound interface. However, when the received topology discovery packet is chaotic and invalid, ring instance node A may determine that the received topology discovery packet is abnormal, and set the topology information to transit from the updating state to the unavailable state.

Step 309: The topology information of ring instance node A transits to the available state.

Step 310: Ring instance node A sends a notification packet that carries the complete topology information of the entire ring to its available eastbound interface and/or westbound interface respectively, notifies the complete topology information of the entire ring to each node of ring instance 1.

Step 311: After receiving the notification packet, each node compares the complete topology information of the entire ring carried in the packet with the topology information stored on the current node.

If the complete topology information of the entire ring carried in the packet is the same as the topology information stored on the current node, the packet is sent to an interface that does not receive the packet; if the interface that does not receive the packet fails, the packet is sent via an interface that receives the packet.

If the complete topology information of the entire ring carried in the packet is different from the topology information stored on the current node, each node reports a topology information comparison abnormality alarm, terminates the packet, and sets the topology information to transit to the unavailable state. The reporting mode includes but is not limited to displaying through a network management system (NMS).

Step 312: When ring instance node A receives the topology information notification packet sent from the current node, the process of updating the topology information ends normally.

If ring instance node A fails to receive the ring notification packet sent from ring instance node A within a certain time interval, the topology information transits from the available state to the unavailable state.

The following describes a process of establishing a ringmap of node A, that is, the process of updating the topology information in the ring instance composed of node A and node B shown in FIG. 4. As shown in FIG. 5, the process includes the following steps:

Step 501: When node A finds that there is no valid topology information (or that the Pe interface changes from the disconnected state to the connected state), node A sends a topology discovery packet P (A) to the Pe interface.

Step 502: Node B receives the P (A) from the Pw interface.

Step 503: Node B determines that the originating node of the P (A) is not node B itself, and adds the node identifier information of node B to the packet to change the topology discovery packet to P (A, B).

Step 504: Node B judges whether the Pe interface of node B can send packets.

If the Pe interface of node B can send packets, node B sends the P (A, B) via the Pe interface.

If the Pe interface of node B cannot send packets, node B sends the P (A, B) via the Pw interface.

In this embodiment, assuming the Pe interface of node B cannot send packets, node B sends the P (A, B) via the Pw interface.

Step 505: Node A receives the P (A, B) from the Pe interface.

Step 506: Node A determines that the originating node of the P (A, B) is node A, terminates the packet, and changes the stored ringmap to (A, B).

Embodiment 3

Figure 6A:
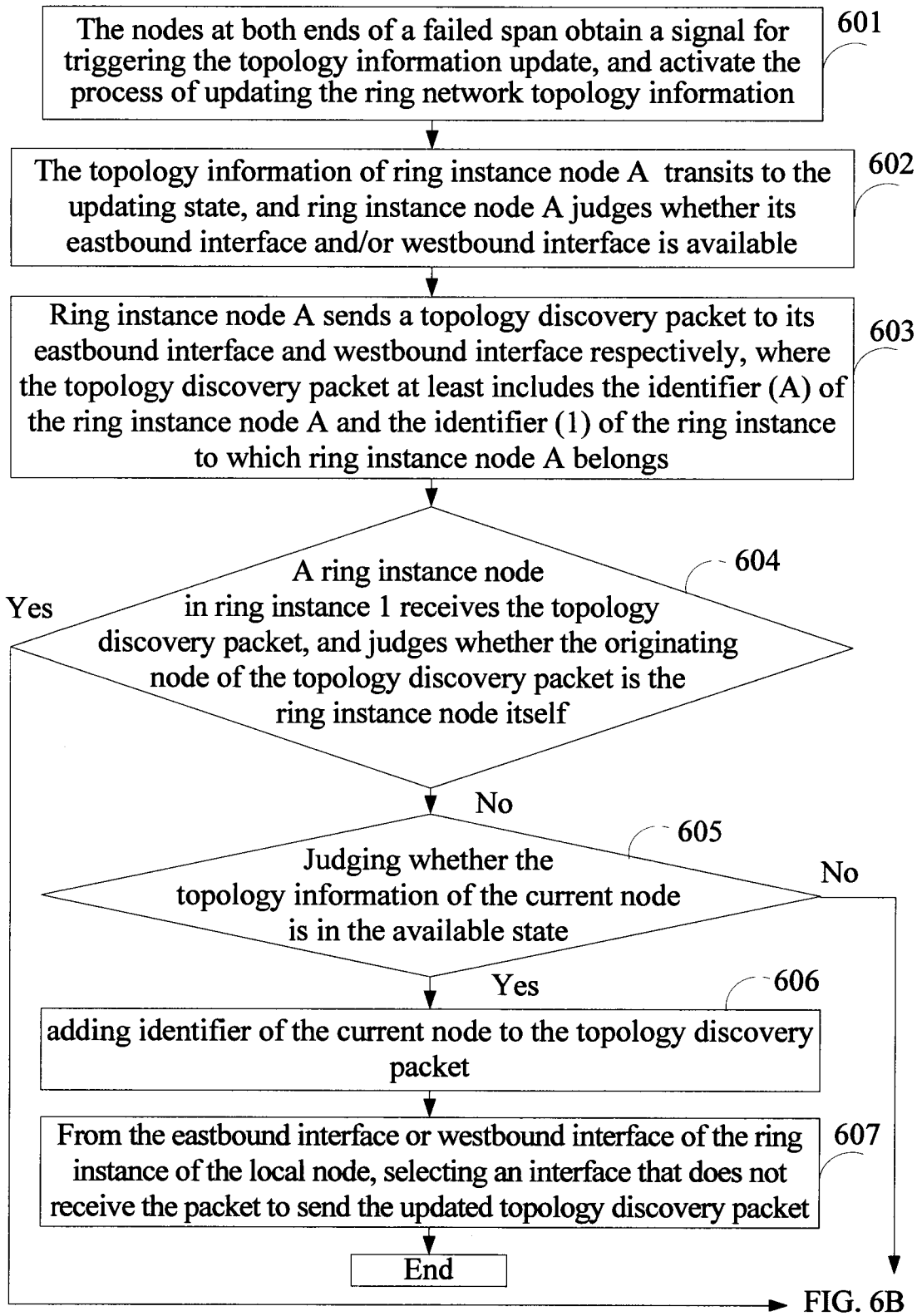
FIGS. 6A and 6B are a flowchart of a method for updating ring network topology information according to Embodiment 3 of the present disclosure.
Figure 6B:
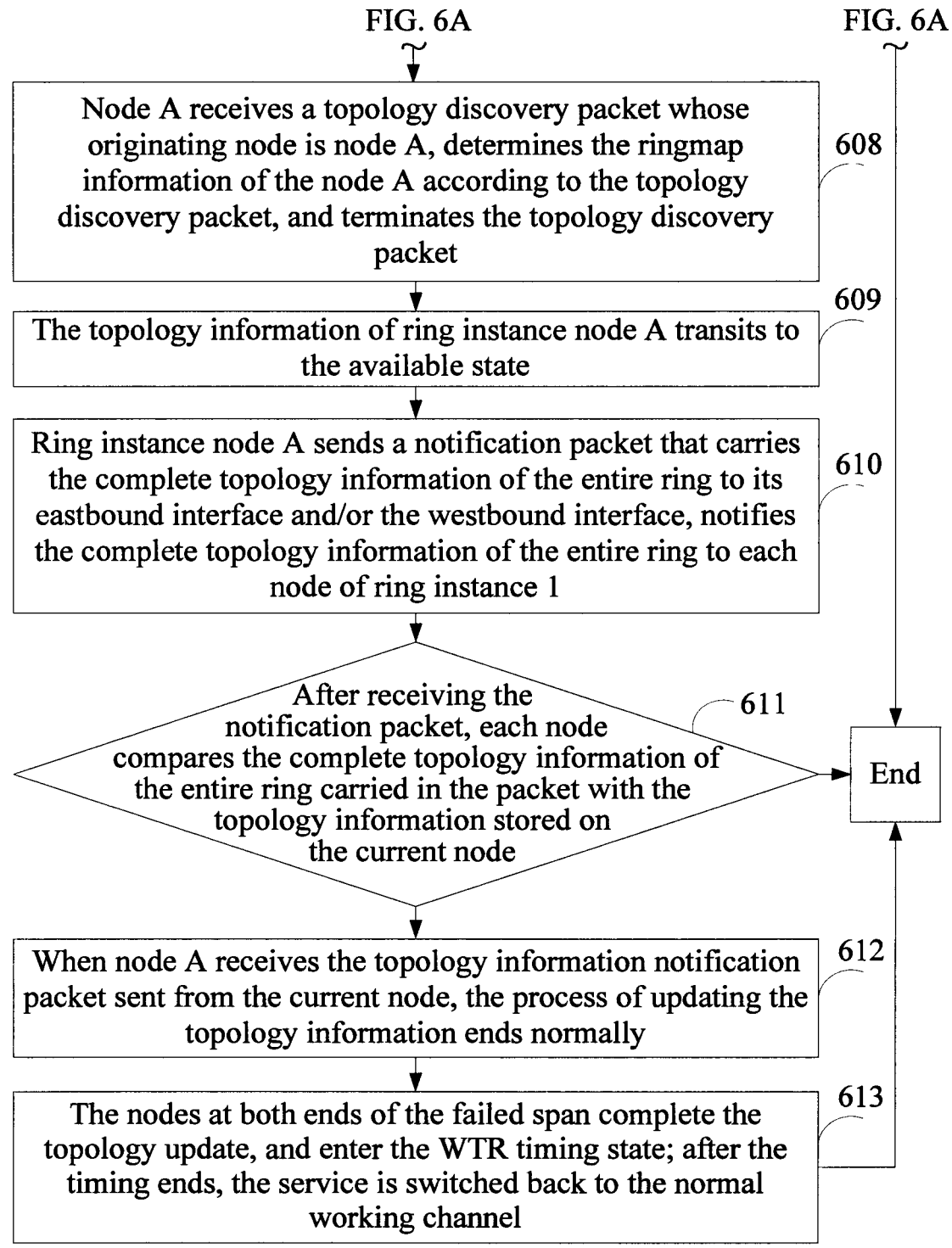

This embodiment provides a method for updating ring network topology information. The method provided in this embodiment is different from the method provided in Embodiment 2 in that: In the method provided in this embodiment, the trigger signal obtained by the ring instance is the second type of trigger signal, that is, the signal for triggering the topology information update when the topology information is in the available state after the failed ring network link is restored. The second type of trigger signal may trigger the nodes on both ends of the failed link to initiate a process of updating the topology information. As shown in FIG. 6, the method includes the following steps:

Step 601: The nodes at both ends of a restored failed span obtain a signal for triggering the topology information update, and activate the process of updating the ring network topology information.

When the operation, administration, and maintenance (OAM) system on the nodes at both ends of the failed span detects that the link is restored, the process of activating the ring network topology information may be triggered.

Step 602 to step 612 are similar to steps in Embodiment 1, and are not further described.

Step 613: The nodes at both ends of the restored failed span complete the topology update, and enter the WTR timing state. When the timing ends, the service is switched back to the normal working channel.

Figure 7:
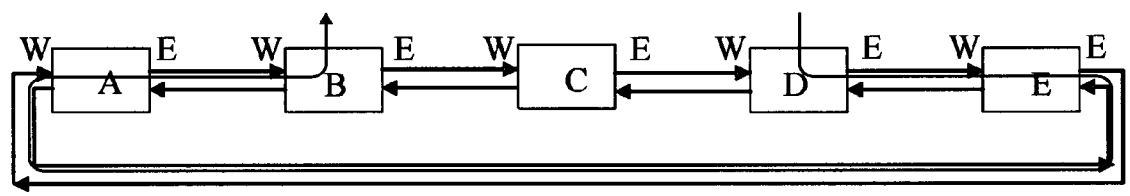
FIG. 7 is a schematic structure diagram of a ring network according to Embodiment 3 of the present disclosure.
Figure 8:
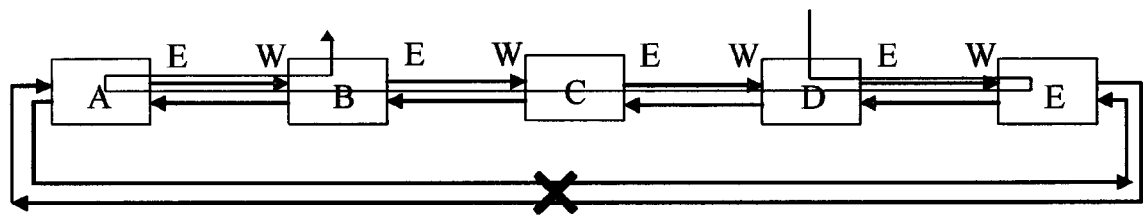
FIG. 8 is a schematic structure diagram of the ring network shown in FIG. 7 when link failures occur according to Embodiment 3 of the present disclosure.
Figure 9:
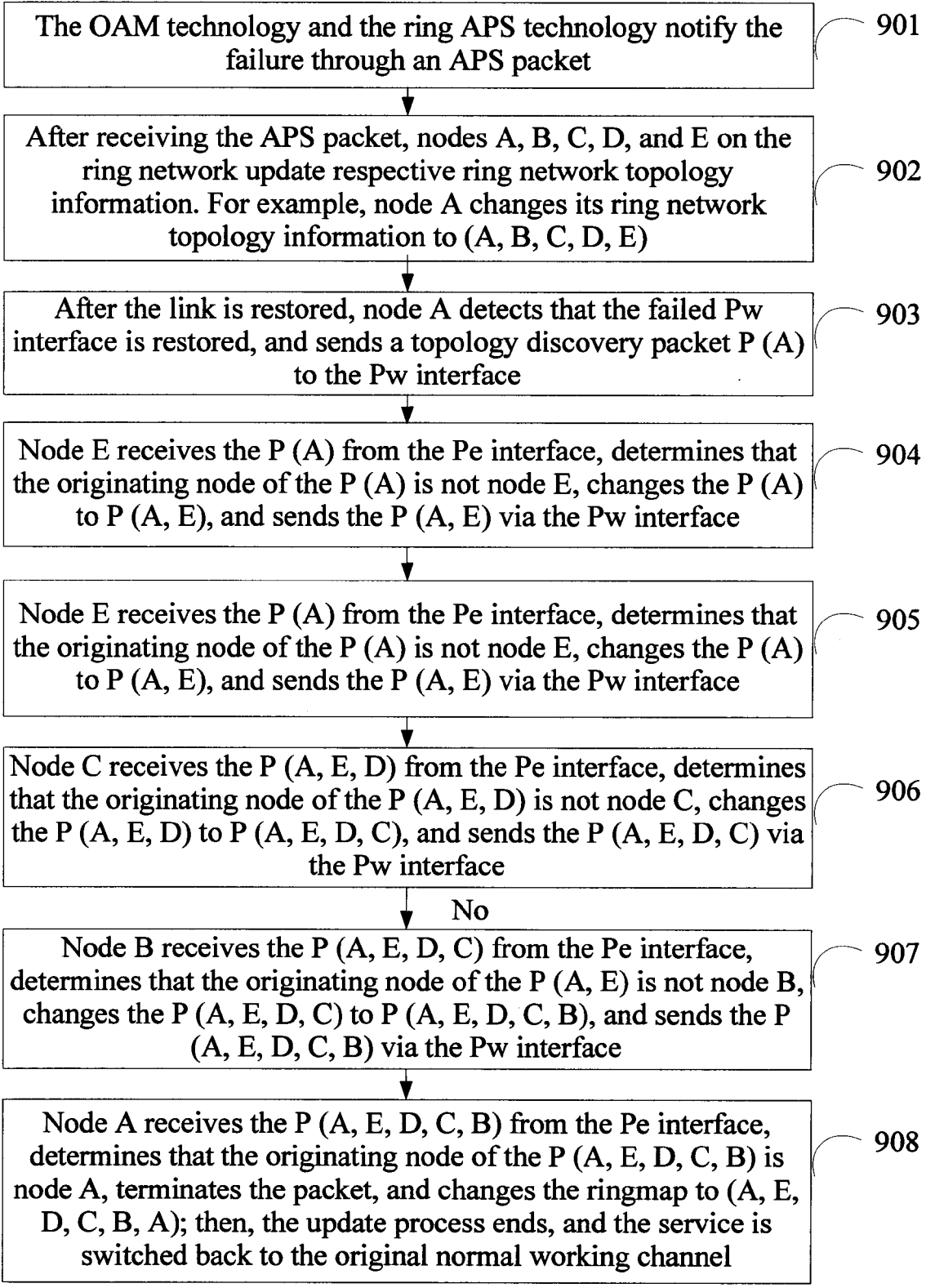
FIG. 9 is a flowchart of a method for updating topology information of node A on the ring network shown in FIG. 7 according to Embodiment 3 of the present disclosure.

The following description is based on a ring instance that is composed of node A, node B, node C, node D, and node E shown in FIG. 7. In the ring instance, each node stores complete ring network topology information under normal circumstances. For example, node A includes complete ringmap information (A, B, C, D, E, A), and node E includes complete ringmap information (E, A, B, C, D, E). Other nodes are not described. The embodiment of the present disclosure provides a process of updating the topology information of node A when the link between the westbound interface of node A and the eastbound interface of node E fails (as shown in FIG. 8). As shown in FIG. 9, the process includes the following steps:

Step 901: The OAM technology and the ring APS technology notify the failure through an APS packet.

Step 902: After receiving the APS packet, nodes A, B, C, D, and E on the ring network update respective ring network topology information. For example, node A changes its ring network topology information to (A, B, C, D, E).

Step 903: After the link is restored, node A detects that the failed Pw interface is restored, and sends a topology discovery packet P (A) to the Pw interface.

Step 904: Node E receives the P (A) from the Pe interface, determines that the originating node of the P (A) is not node E, changes the P (A) to P (A, E), and sends the P (A, E) via the Pw interface.

Step 905: Node D receives the P (A, E) from the Pe interface, determines that the originating node of the P (A, E) is not node D, changes the P (A, E) to P (A, E, D), and sends the P (A, E, D) via the Pw interface.

Step 906: Node C receives the P (A, E, D) from the Pe interface, determines that the originating node of the P (A, E, D) is not node C, changes the P (A, E, D) to P (A, E, D, C), and sends the P (A, E, D, C) via the Pw interface.

Step 907: Node B receives the P (A, E, D, C) from the Pe interface, determines that the originating node of the P (A, E) is not node B, changes the P (A, E, D, C) to P (A, E, D, C, B), and sends the P (A, E, D, C, B) via the Pw interface.

Step 908: Node A receives the P (A, E, D, C, B) from the Pe interface, determines that the originating node of the P (A, E, D, C, B) is node A, terminates the packet, and changes the ringmap to (A, E, D, C, B, A). Then, the update process ends, and the service is switched back to the original normal working channel.

Embodiment 4

Figure 10:
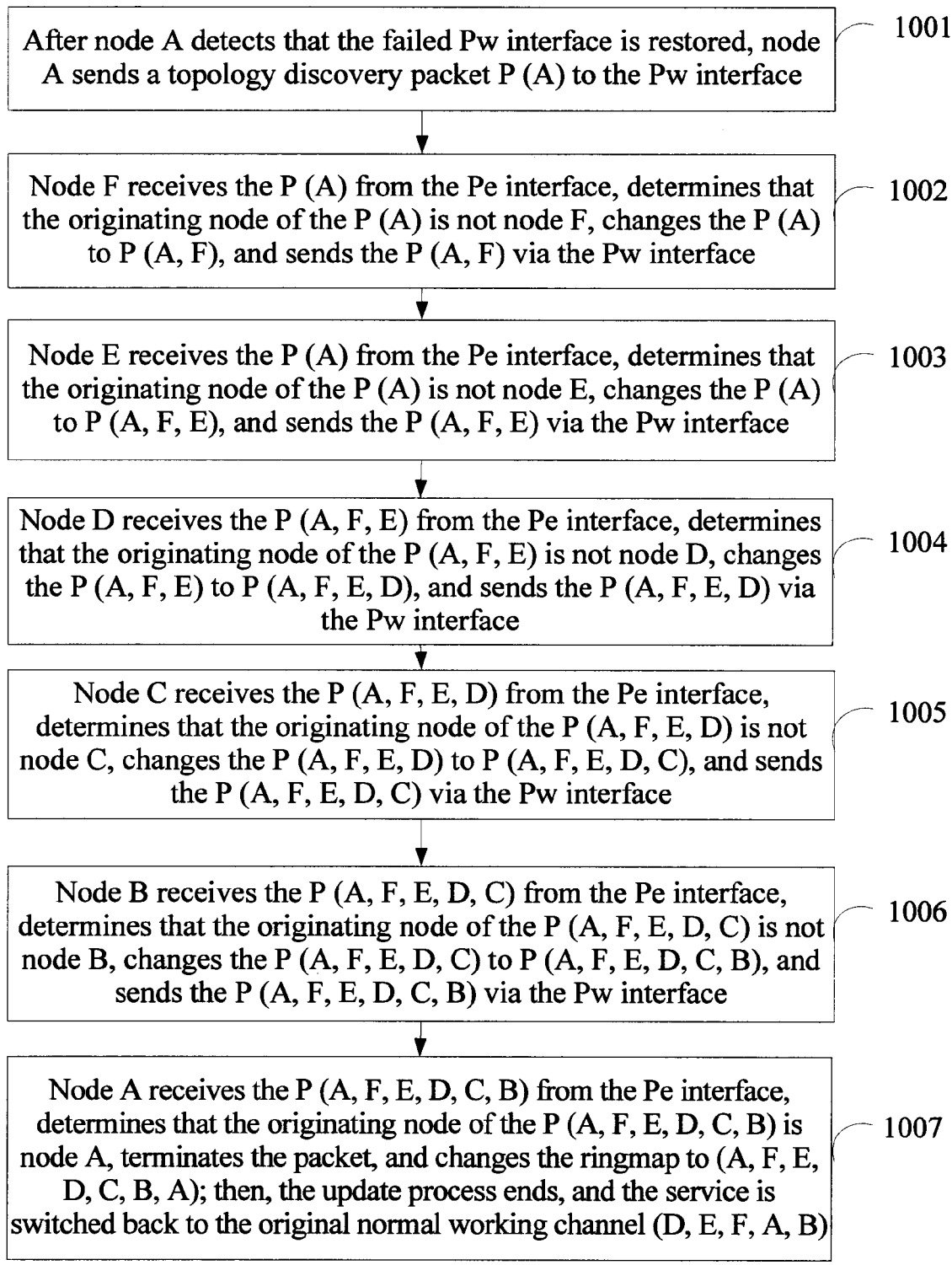
FIG. 10 is a flowchart of a method for updating ring network topology information according to Embodiment 4 of the present disclosure.

Embodiment 4 of the present disclosure provides a method for updating ring network topology information. This embodiment is different from Embodiment 3 in that: The method provided in this embodiment is a method for updating topology information in a scenario where nodes need to be added to or deleted from a ring instance. This embodiment is also based on a ring network composed of node A, node B, node C, node D, and node E shown in FIG. 7. It is assumed that a service enters the ring via node D and goes out of the ring after passing through node E and node A. On the ring network, each node stores the complete ring network topology information under normal circumstances. For example, node A includes complete ringmap information (A, B, C, D, E, A), and node E includes complete ringmap information (E, A, B, C, D, E). Other nodes are not described. In the embodiment of the present disclosure, when node F needs to be added between node A and node E, the link between node A and node E should be disconnected; after nodes A and E detect an alarm, the two nodes switch the service. In addition, the topology information of the two nodes is already updated automatically by using the method provided in Embodiment 3. When the westbound interface of node F configured with ring information is connected to the eastbound interface of node E and the eastbound interface of node F is connected to the westbound interface of node A, the process of updating the topology information of node A is shown in FIG. 10.

Step 1001: After node A detects that the failed Pw interface is restored, node A sends a topology discovery packet P (A) to the Pw interface.

Step 1002: Node F receives the P (A) from the Pe interface, determines that the originating node of the P (A) is not node F, changes the P (A) to P (A, F), and sends the P (A, F) via the Pw interface.

Step 1003: Node E receives the P (A) from the Pe interface, determines that the originating node of the P (A) is not node E, changes the P (A) to P (A, F, E), and sends the P (A, F, E) via the Pw interface.

Step 1004: Node D receives the P (A, F, E) from the Pe interface, determines that the originating node of the P (A, F, E) is not node D, changes the P (A, F, E) to P (A, F, E, D), and sends the P (A, F, E, D) via the Pw interface.

Step 1005: Node C receives the P (A, F, E, D) from the Pe interface, determines that the originating node of the P (A, F, E, D) is not node C, changes the P (A, F, E, D) to P (A, F, E, D, C), and sends the P (A, F, E, D, C) via the Pw interface.

Step 1006: Node B receives the P (A, F, E, D, C) from the Pe interface, determines that the originating node of the P (A, F, E, D, C) is not node B, changes the P (A, F, E, D, C) to P (A, F, E, D, C, B), and sends the P (A, F, E, D, C, B) via the Pw interface.

Step 1007: Node A receives the P (A, F, E, D, C, B) from the Pe interface, determines that the originating node of the P (A, F, E, D, C, B) is node A, terminates the packet, and changes the ringmap to (A, F, E, D, C, B, A). Then, the update process ends, and the service is switched back to the normal working channel (D, E, F, A, B).

Embodiment 5

Figure 11:
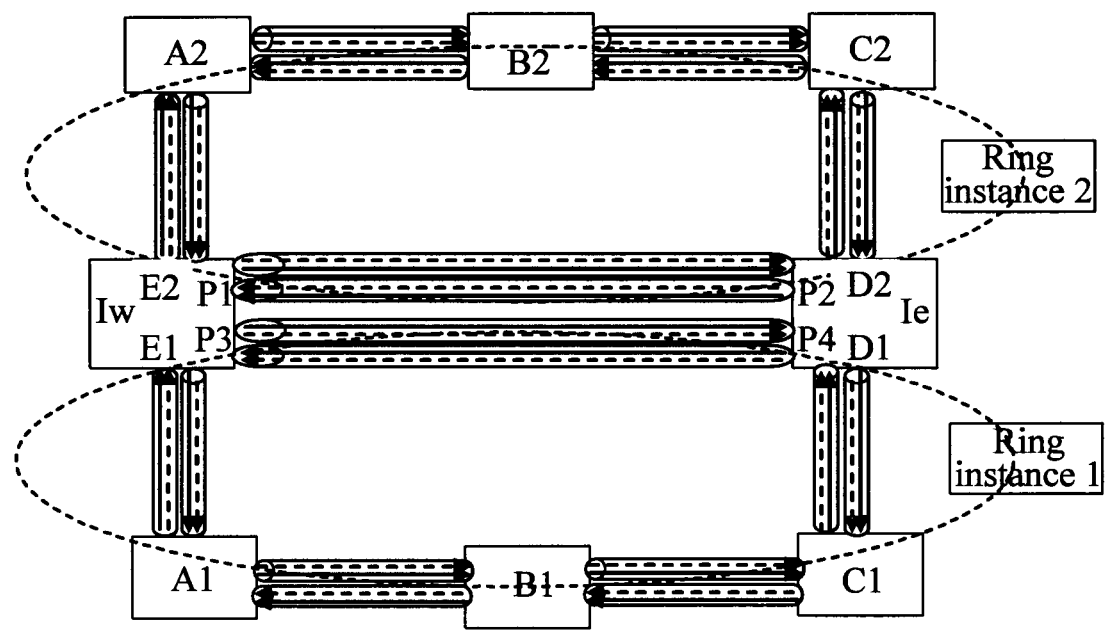
FIG. 11 is a schematic structure diagram of a ring network according to Embodiment 4 of the present disclosure.

Embodiment 5 of the present disclosure provides a method for updating ring network topology information. The following describes the method for updating ring network topology information in detail with reference to a scenario where two intersecting ring instances exist on the network shown in FIG. 11. Two ring instances exist on the network shown in FIG. 11: ring instance 1 (A1, B1, C1, D1, E1) and ring instance 2 (A2, B2, C2, D2, E2). The intersecting points between the two ring instances are physical nodes Iw and Ie. The Iw node includes two ring instance nodes E1 and E2, and the Ie includes two ring instance nodes D1 and D2. Under normal circumstances, each ring instance node stores complete ring network topology information. For example, node C1 stores complete ring information (C1, D1, E1, A1, B1, C1), and node D2 stores complete ring information (D2, E2, A2, B2, C2, D2).

Figure 12:
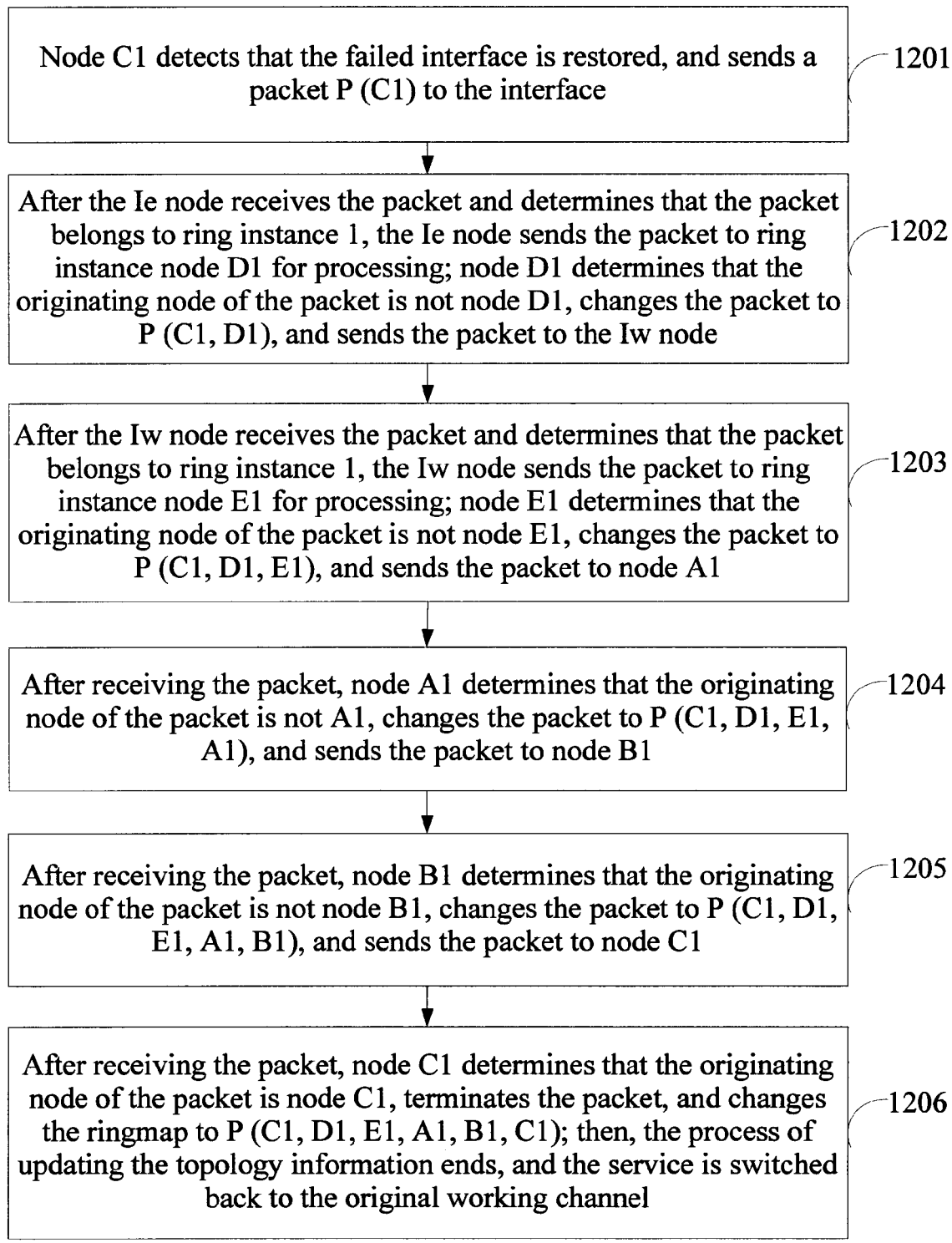
FIG. 12 is a flowchart of a method for updating topology information of node C1 when the failed link on the ring network shown in FIG. 11 is restored according to Embodiment 4 of the present disclosure.

When the link between node C1 and node D1 fails, the conventional OAM technology and ring APS technology may notify the failure through an APS packet; after receiving the APS packet, each ring instance node updates respective ring network topology information. For example, the topology information of node C1 is changed to (C1, B1, A1, E1, D1), the ring network topology information of node D1 is changed to (D1, E1, A1, B1, C1), and the topology information of node D2 remains unchanged. After the failed link is restored, as shown in FIG. 12, the method for updating the topology information of node C1 includes the following steps:

Step 1201: Node C1 detects that the failed interface is restored, and sends a packet P (C1) to the interface.

Step 1202: After the Ie node receives the packet and determines that the packet belongs to ring instance 1, the Ie node sends the packet to ring instance node D1 for processing. Node D1 determines that the originating node of the packet is not node D1, changes the packet to P (C1, D1), and sends the packet to the Iw node.

Step 1203: After the Iw node receives the packet and determines that the packet belongs to ring instance 1, the Iw node sends the packet to ring instance node E1 for processing. Node E1 determines that the originating node of the packet is not node E1, changes the packet to P (C1, D1, E1), and sends the packet to node A1.

Step 1204: After receiving the packet, node A1 determines that the originating node of the packet is not node A1, changes the packet to P (C1, D1, E1, A1), and sends the packet to node B1.

Step 1205: After receiving the packet, node B1 determines that the originating node of the packet is not node B1, changes the packet to P (C1, D1, E1, A1, B1), and sends the packet to node C1.

Step 1206: After receiving the packet, node C1 determines that the originating node of the packet is node C1, terminates the packet, and changes the ringmap to P (C1, D1, E1, A1, B1, C1). Then, the process of updating the topology information ends, and the service is switched back to the original working channel.

By using the method for updating topology information according to Embodiment 1 to Embodiment 5, a ring instance node sends a topology discovery packet to other nodes in the ring instance, and carries the identifier of the ring instance node in the topology discovery packet; the topology discovery packet may record the identifiers of the nodes traversed by the packet; when the originating node of the topology discovery packet receives the topology discovery packet, the topology information of the ring instance is obtained. Further, when a link between two nodes on the ring network fails, the originating node of the topology discovery packet may know the failure by comparing the packet received by the eastbound interface with the packet received by the westbound interface. In this way, common failures such as wrong connections on the ring network may be detected while the updated topology information of the ring network is obtained, which greatly reduces the operation and maintenance workload. Furthermore, in comparison with the prior art that updates ring network topology information manually, the method for updating topology information may simplify the configuration of the protection ring network, and add or delete nodes dynamically without human intervention, thereby improving the reliability and manageability of the system.

Embodiment 6

Figure 13:
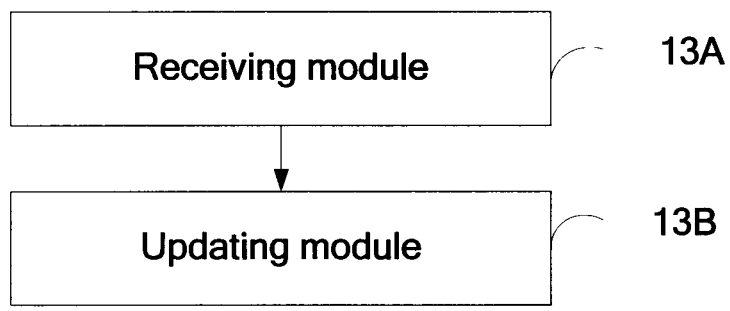
FIG. 13 is a schematic structure diagram of an apparatus for updating ring network topology information according to Embodiment 5 of the present disclosure.

Embodiment 6 of the present disclosure provides an apparatus for updating ring network topology information. As shown in FIG. 13, the apparatus includes:

a receiving module 13A, configured to receive a topology discovery packet sent from an originating node, where the topology discovery packet at least carries identifiers of nodes traversed by the topology discovery packet when the packet is transferred from the originating node to the current node; and an updating module 13B, configured to update the ring network topology information of the current node according to the identifiers of the nodes carried in the topology discovery packet.

The state of the topology information may at least include the following: initial state, updating state, available state, and unavailable state.

When a ring network is set up, the current node sets the topology information to the initial state.

When the update process begins, the current node sets the topology information to the updating state.

When the update process ends normally, the current node sets the topology information to the available state.

When the update process ends abnormally, the current node sets the topology information to the unavailable state.

The apparatus further includes:

a judging module, configured to judge whether the current node is the originating node of the topology discovery packet.

Accordingly, the updating module 13B includes:

a first unit, configured to update the ring network topology information of the current node according to the identifiers of the nodes carried in the topology discovery packet when the judging module determines that the current node is the originating node of the topology discovery packet; and a second unit, configured to update the ring network topology information of the current node according to the state of the topology information of the current node and the identifier of the nodes carried in the topology discovery packet when the judging module determines that the current node is not the originating node of the topology discovery packet.

The first unit includes:

a checking subunit, configured to check whether the identifiers of the nodes carried in the topology discovery packet are valid; if the identifiers of the nodes carried in the topology discovery packet are valid, update the ring network topology information of the current node according to the identifiers of the nodes carried in the topology discovery packet; if the identifiers of the nodes carried in the topology discovery packet are invalid, the current node sets the topology information of the current node to transit from the updating state to the unavailable state.

The second unit includes:

an updating subunit, configured to when the topology information of the current node is in the available state, update the ring network topology information of the current node according to the identifiers carried in the topology discovery packet; when the topology information of the current node is in the unavailable state, not update the ring network topology information of the current node.

The apparatus further includes:

an adding module, configured to add the identifier of the current node to the topology discovery packet, and transfer the topology discovery packet to a next node.

The apparatus further includes:

a sending module, configured to send the updated ring network topology information to other nodes of the ring instance when the current node is the originating node of the topology discovery packet, where the updated ring network topology information is used by the other nodes to check whether the ring network topology information stored on the other nodes is correct after the other nodes receive the updated ring network topology information.

The apparatus further includes:

a checking module, configured to receive the updated ring network topology information sent from other nodes; check whether the stored ring network topology information is correct according to the updated ring network topology information; when the updated ring network topology information is the same as the stored ring network topology information, send the updated ring network topology information to a next node; and when the updated ring network topology information is different from the stored ring network topology information, report a topology information comparison abnormity alarm, and terminate the update abnormally.

By using the apparatus for updating topology information according to the embodiment of the present disclosure, a ring instance node sends a topology discovery packet to other nodes in the ring instance, and carries the identifier of the ring instance node in the topology discovery packet; the topology discovery packet may record the identifiers of the nodes traversed by the packet; when the originating node of the topology discovery packet receives the topology discovery packet, the topology information of the ring instance is obtained. Further, when a link between two nodes on the ring network fails, the originating node of the topology discovery packet may know the failure by comparing the packet received by the eastbound interface with the packet received by the westbound interface. In this way, common failures such as wrong connections on the ring network may be detected while the updated topology information of the ring network is obtained, which greatly reduces the operation and maintenance workload. Furthermore, in comparison with the prior art that updates ring network topology information manually, the apparatus for updating topology information may simplify the configuration of the protection ring network, and add or delete nodes dynamically without human intervention, thereby improving the reliability and manageability of the system.

Embodiment 7

Figure 14:
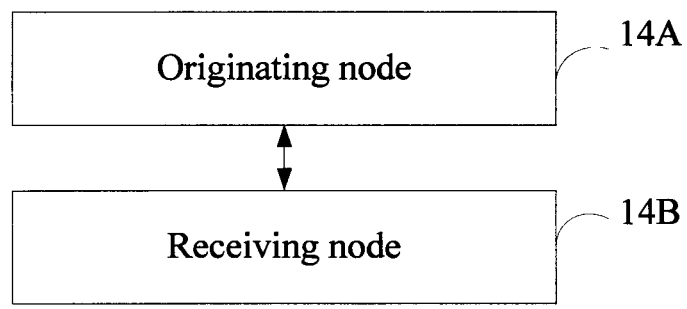
FIG. 14 is a schematic structure diagram of a system for updating ring network topology information according to Embodiment 6 of the present disclosure.

Embodiment 7 of the present disclosure provides a system for updating ring network topology information. As shown in FIG. 14, the system includes an originating node 14A and a receiving node 14B.

The originating node 14A is configured to send a topology discovery packet.

The receiving node 14B may include the apparatus for updating ring network topology information according to Embodiment 6 of the present disclosure. The apparatus is already described in detail in Embodiment 6, and is not further described.

On a ring network, a node may be an originating node or a receiving node or be both an originating node and a receiving node. For the specific process of updating the topology information of the nodes, see the method provided in Embodiment 1 to Embodiment 5. For the specific structures of the nodes, see the apparatus provided in Embodiment 6. Details are omitted in this embodiment.

By using the system for updating topology information according to the embodiment of the present disclosure, a ring instance node sends a topology discovery packet to other nodes in the ring instance, and carries the identifier of the ring instance node in the topology discovery packet; the topology discovery packet may record the identifiers of the nodes traversed by the packet; when the originating node of the topology discovery packet receives the topology discovery packet, the topology information of the ring instance is obtained. Further, when a link between two nodes on the ring network fails, the originating node of the topology discovery packet may know the failure by comparing the packet received by the eastbound interface with the packet received by the westbound interface. In this way, common failures such as wrong connections on the ring network may be detected while the updated topology information of the ring network is obtained, which greatly reduces the operation and maintenance workload. Furthermore, in comparison with the prior art that updates ring network topology information manually, the system for updating topology information may simplify the configuration of the protection ring network, and add or delete nodes dynamically without human intervention, thereby improving the reliability and manageability of the system.

It is understandable to those skilled in the art that all or part of the steps in the methods provided in the preceding embodiments may be performed by hardware instructed by a program. The program may be stored in a computer readable storage medium, such as a read only memory or random access memory (ROM/RAM), a magnetic disk, and a compact disk-read only memory (CD-ROM).

The above descriptions are merely exemplary embodiments of the present disclosure, but not intended to limit the scope of the present disclosure. Any modification, equivalent replacement, or improvement made without departing from the spirit and principle of the present disclosure should fall within the scope of the present disclosure.

What is claimed is:

1. A method for updating ring network topology information, the method comprising:

receiving, by a current node, a topology discovery packet from an originating node, wherein the topology discovery packet at least carries identifiers (IDs) of nodes traversed by the topology discovery packet when the packet is transferred from the originating node to the current node, and wherein the topology discovery packet is sent by the originating node after the originating node obtains a signal for triggering the topology information update;

judging, by the current node, whether the current node is the originating node of the topology discovery packet;

updating, by the current node, ring network topology information of the current node according to the identifiers of the nodes carried in the topology discovery packet; the updating comprising:

when the current node is the originating node of the topology discovery packet, updating, by the current node, the ring network topology information of the current node according to the identifiers of the nodes carried in the topology discovery packet;

when the current node is not the originating node of the topology discovery packet, updating, by the current node, the ring network topology information of the current node according to a state of the topology information of the current node and the identifiers of the nodes carried in the topology discovery packet;

wherein the signal for triggering the topology information update is a signal for triggering the topology information update when the topology information is in an unavailable state in a scenario where the topology information update is triggered in manual mode or timing mode; and wherein updating, by the current node, the ring network topology information of the current node according to the state of the topology information of the current node and the identifiers of the nodes carried in the topology discovery packet comprises:

when the topology information of the current node is in an available state, updating, by the current node, the ring network topology information of the current node according to the identifiers of the nodes carried in the topology discovery packet; and when the topology information of the current node is not in the available state, not updating, by the current node, the ring network topology information of the current node.

2. The method according to claim 1, wherein after updating by the current node, the ring network topology information of the current node according to the state of the topology information of the current node and the identifiers of the nodes carried in the topology discovery packet, the method further comprises:

adding by the current node, the identifier of the current node to the topology discovery packet, and transferring, by the current node, the topology discovery packet to a next node.

3. The method according to claim 1, wherein the identifiers comprise an identifier of a ring instance node and a ring instance identifier to which the ring instance node belongs.

4. The method according to claim 1, wherein the state of the ring network topology information at least comprises one of the following: initial state, updating state, available state, and unavailable state, wherein:

when a ring network is set up, the current node sets the topology information to the initial state;

when the update process begins, the current node sets the topology information to the updating state;

when the update process ends normally, the current node sets the topology information to the available state; and when the update process ends abnormally, the current node sets the topology information to the unavailable state.

5. The method according to claim 4, wherein updating the ring network topology information of the current node according to the identifiers of the nodes carried in the topology discovery packet comprises:
- checking whether the identifiers of the nodes carried in the topology discovery packet are valid;
- if the identifiers of the nodes carried in the topology discovery packet are valid, updating the ring network topology information of the current node according to the identifiers of the nodes carried in the topology discovery packet; and
- if the identifiers of the nodes carried in the topology discovery packet are invalid, setting, by the current node, the topology information of the current node to transit from the updating state to the unavailable state.

6. The method according to claim 1, wherein after updating the ring network topology information of the current node according to the identifiers of the nodes carried in the topology discovery packet, the method further comprises:
- when the current node is the originating node of the topology discovery packet, sending the updated ring network topology information to other nodes of a ring instance, wherein the updated ring network topology information is used by the other nodes to check whether the ring network topology information stored on the other nodes is correct after the other nodes receive the updated ring network topology information.

7. The method according to claim 1, further comprising:
- receiving the updated ring network topology information from the other nodes;
- checking whether the stored ring network topology information is correct according to the updated ring network topology information;
- when the updated ring network topology information is the same as the stored ring network topology information, sending the updated ring network topology information to a next node; and
- when the updated ring network topology information is different from the stored ring network topology information, reporting a topology information comparison abnormity alarm, and terminating the update abnormally.

8. An apparatus for updating ring network topology information, the apparatus comprises a processor coupled with a non-transitory storage, the processor configured to:
- receive a topology discovery packet from an originating node, wherein the topology discovery packet at least carries identifiers (IDs) of nodes traversed by the topology discovery packet when the packet is transferred from the originating node to a current node, and wherein the topology discovery packet is sent by the originating node after the originating node obtains a signal for triggering the topology information update;
- judge whether the current node is the originating node of the topology discovery packet;
- update ring network topology information of the current node according to the identifiers of the nodes carried in the topology discovery packet;

the processor further configured to:
- update the ring network topology information of the current node according to the identifiers of the nodes carried in the topology discovery packet in response to determining that the current node is the originating node of the topology discovery packet;
- update the ring network topology information of the current node according to state of the topology information of the current node and the identifiers of the nodes carried in the topology discovery packet in response to determining that the current node is not the originating node of the topology discovery packet;

wherein the signal for triggering the topology information update is a signal for triggering the topology information update when the topology information is in an unavailable state in a scenario where the topology information update is triggered in manual mode or timing mode; and wherein the processor is further configured to:
- when the topology information of the current node is in an available state, update the ring network topology information of the current node according to the identifiers carried in the topology discovery packet; and
- when the topology information of the current node is in the unavailable state, not update the ring network topology information of the current node.

9. The apparatus according to claim 8, wherein the processor is further configured to:
- add the identifier of the current node to the topology discovery packet, and transfer the topology discovery packet to a next node.

10. The apparatus according to claim 8, wherein the identifiers comprise an identifier of a ring instance node and a ring instance identifier to which the ring instance node belongs.

11. The apparatus according to claim 8, wherein the state of the ring network topology information at least comprises one of the following: initial state, updating state, available state, and unavailable state, wherein:
- when a ring network is set up, the current node sets the topology information to the initial state;
- when the update process begins, the current node sets the topology information to the updating state;
- when the update process ends normally, the current node sets the topology information to the available state; and
- when the update process ends abnormally, the current node sets the topology information to the unavailable state.

12. The apparatus according to claim 11, wherein the processor is further configured to:
- check whether the identifiers of the nodes carried in the topology discovery packet are valid; if the identifiers of the nodes carried in the topology discovery packet are valid, update the ring network topology information of the current node according to the identifiers of the nodes carried in the topology discovery packet; if the identifiers of the nodes carried in the topology discovery packet are invalid, the current node sets the topology information of the current node to transit from the updating state to the unavailable state.

13. The apparatus according to claim 11, wherein the processor is further configured to:
- when the topology information of the current node is in the available state, update the ring network topology information of the current node according to the identifiers carried in the topology discovery packet; when the topology information of the current node is in the unavailable state, not update the ring network topology information of the current node.

14. The apparatus according to claim 8, wherein the processor is further configured to:
- receive the updated ring network topology information from the other nodes; check whether the stored ring network topology information is correct according to the updated ring network topology information; when the updated ring network topology information is the same as the stored ring network topology information, send the updated ring network topology information to a next node; and when the updated ring network topology information is different from the stored ring network topology information, report a topology information comparison abnormity alarm, and terminate the update abnormally.

15. A system for updating ring network topology information, the system comprising an originating node and a receiving node, wherein:
the originating node is configured to acquire update trigger signal and send a topology discovery packet; and
the receiving node comprises a processor coupled with a non-transitory storage, the processor configured to:
receive a topology discovery packet from an originating node, wherein the topology discovery packet at least carries identifiers (IDs) of nodes traversed by the topology discovery packet when the packet is transferred from the originating node to a current node, and wherein the topology discovery packet is sent by the originating node after the originating node obtains a signal for triggering the topology information update;
judge whether the current node is the originating node of the topology discovery packet;
update ring network topology information of the current node according to the identifiers of the nodes carried in the topology discovery packet, the processor further configured to:
update the ring network topology information of the current node according to the identifiers of the nodes carried in the topology discovery packet in response to determining that the current node is the originating node of the topology discovery packet;
update the ring network topology information of the current node according to state of the topology information of the current node and the identifiers of the nodes carried in the topology discovery packet in response to determining that the current node is not the originating node of the topology discovery packet;
wherein the signal for triggering the topology information update is a signal for triggering the topology information update when the topology information is in an unavailable state in a scenario where the topology information update is triggered in manual mode or timing mode; and
wherein updating the ring network topology information of the current node according to the state of the topology information of the current node and the identifiers of the nodes carried in the topology discovery packet comprises:
when the topology information of the current node is in an available state, updating the ring network topology information of the current node according to the identifiers carried in the topology discovery packet; and
when the topology information of the current node is not in the available state, not updating the ring network topology information of the current node.

16. A method for updating ring network topology information, the method comprising:
receiving a topology discovery packet from an originating node, wherein the topology discovery packet at least carries identifiers (IDs) of nodes traversed by the topology discovery packet when the packet is transferred from the originating node to a current node, and wherein the topology discovery packet is sent by the originating node after the originating node obtains a signal for triggering the topology information update;
judging whether the current node is the originating node of the topology discovery packet;
updating ring network topology information of the current node according to the identifiers of the nodes carried in the topology discovery packet; the updating comprising:
when the current node is the originating node of the topology discovery packet, updating the ring network topology information of the current node according to the identifiers of the nodes carried in the topology discovery packet;
when the current node is not the originating node of the topology discovery packet, updating the ring network topology information of the current node according to a state of the topology information of the current node and the identifiers of the nodes carried in the topology discovery packet;
wherein the signal for triggering the topology information update is a signal for triggering the topology information update when the topology information is in an unavailable state in a scenario where the topology information update is triggered in manual mode or timing mode; and
wherein the updating the ring network topology information of the current node according to the state of the topology information of the current node and the identifiers of the nodes carried in the topology discovery packet comprises:
when the topology information of the current node is in an available state, updating the ring network topology information of the current node according to the identifiers carried in the topology discovery packet; and
when the topology information of the current node is not in the available state, not updating the ring network topology information of the current node.

17. An apparatus for updating ring network topology information, the apparatus comprises a processor coupled with a non-transitory storage, the processor configured to:
receive a topology discovery packet from an originating node, wherein the topology discovery packet at least carries identifiers (IDs) of nodes traversed by the topology discovery packet when the packet is transferred from the originating node to a current node, and wherein the topology discovery packet is sent by the originating node after the originating node obtains a signal for triggering the topology information update;
judge whether the current node is the originating node of the topology discovery packet;
update ring network topology information of the current node according to the identifiers of the nodes carried in the topology discovery packet;
the processor further configured to:
update the ring network topology information of the current node according to the identifiers of the nodes carried in the topology discovery packet in response to determining that the current node is the originating node of the topology discovery packet;
update the ring network topology information of the current node according to state of the topology information of the current node and the identifiers of the nodes carried in the topology discovery packet in response to determining that the current node is not the originating node of the topology discovery packet;
wherein the signal for triggering the topology information update is a signal for triggering the topology information update when the topology information is in the initial state in a scenario where the ring network is set up and a ring instance is activated; and
wherein the processor is further configured to:
when the topology information of the current node is in an available state, update the ring network topology information of the current node according to the identifiers carried in the topology discovery packet; and when the topology information of the current node is in an unavailable state, not update the ring network topology information of the current node.

18. A system for updating ring network topology information, the system comprising an originating node and a receiving node, wherein:

the originating node is configured to acquire update trigger signal and send a topology discovery packet; and the receiving node comprises a processor coupled with a non-transitory storage, the processor configured to:

receive a topology discovery packet from an originating node, wherein the topology discovery packet at least carries identifiers (IDs) of nodes traversed by the topology discovery packet when the packet is transferred from the originating node to a current node, and wherein the topology discovery packet is sent by the originating node after the originating node obtains a signal for triggering the topology information update;

judge whether the current node is the originating node of the topology discovery packet;

update ring network topology information of the current node according to the identifiers of the nodes carried in the topology discovery packet; the processor further configured to:

update the ring network topology information of the current node according to the identifiers of the nodes carried in the topology discovery packet in response to determining that the current node is the originating node of the topology discovery packet;

update the ring network topology information of the current node according to a state of the topology information of the current node and the identifiers of the nodes carried in the topology discovery packet in response to determining that the current node is not the originating node of the topology discovery packet;

wherein the signal for triggering the topology information update is a signal for triggering the topology information update when the topology information is in the initial state in a scenario where the ring network is set up and a ring instance is activated; and wherein updating the ring network topology information of the current node according to the state of the topology information of the current node and the identifiers of the nodes carried in the topology discovery packet comprises:

when the topology information of the current node is in an available state, update the ring network topology information of the current node according to the identifiers carried in the topology discovery packet; and when the topology information of the current node is not in the available state, not update the ring network topology information of the current node.

* * * * *

UNITED STATES PATENT AND TRADEMARK OFFICE
CERTIFICATE OF CORRECTION

PATENT NO. : 9,237,092 B2  
APPLICATION NO. : 13/437295  
DATED : January 12, 2016  
INVENTOR(S) : Jianqun Chen and Jia He Page 1 of 1

It is certified that error appears in the above-identified patent and that said Letters Patent is hereby corrected as shown below:

On the title page item (73), Assignee: Delete "(CH)" and insert -- (CN) --.

Signed and Sealed this  
Third Day of May, 2016

Michelle K. Lee  
*Director of the United States Patent and Trademark Office*